United States Patent [19]

Shimizu et al.

[11] Patent Number: 4,940,418
[45] Date of Patent: Jul. 10, 1990

[54] CARD READ/WRITE DEVICE

[75] Inventors: Makoto Shimizu; Hiroshi Konishi, both of Tokyo, Japan

[73] Assignee: OKI Electric Industry Co., Ltd., Tokyo, Japan

[21] Appl. No.: 340,933

[22] Filed: Apr. 20, 1989

[30] Foreign Application Priority Data

Apr. 21, 1988 [JP] Japan .................................. 63-98765

[51] Int. Cl.$^5$ .......................................... H01R 13/15
[52] U.S. Cl. .................................. 439/260; 439/328; 235/482; 235/486
[58] Field of Search ............... 439/259, 260, 261, 263, 439/264, 267, 325, 326, 327, 328; 902/8, 9, 41; 235/475, 479, 482, 483, 486

[56] References Cited

U.S. PATENT DOCUMENTS

| 4,141,616 | 2/1979 | Gottlieb | 439/263 |
| 4,171,737 | 10/1979 | McLaughlin | 194/210 |
| 4,443,049 | 4/1984 | DePommery et al. | 339/75 |
| 4,734,567 | 3/1988 | Hansbauer | 235/482 |
| 4,743,746 | 5/1988 | Murschall et al. | 235/486 |
| 4,762,212 | 8/1988 | Fish et al. | 235/482 X |

FOREIGN PATENT DOCUMENTS

| 0255435 | 7/1987 | European Pat. Off. | |
| 61-16386 | 1/1986 | Japan | 439/267 |
| 0639056 | 12/1978 | U.S.S.R. | 439/260 |

Primary Examiner—Neil Abrams
Assistant Examiner—Khiem Nguyen
Attorney, Agent, or Firm—Panitch Schwarze Jacobs & Nadel

[57] ABSTRACT

A card read/write device comprises a frame having a card insertion opening, electrode terminals arranged according to electrodes provided on a card, and a disconnection mechanism for moving the electrode terminals to and away from the electrodes of the card. The disconnection mechanism is rotatably mounted on the frame and comprises contact members having the electrode terminals, transfer levers interlocked with insertion of the card for permitting the electrode terminals to contact the electrodes of the card, and a spring for urging the contact members in the direction to move the contact members away from the card.

6 Claims, 3 Drawing Sheets

CARD READ/WRITE DEVICE

BACKGROUND OF THE INVENTION

1. Field of the Invention:

The present invention relates to a card read/write device enabling to effect write/read operation of data for a card such as IC card having electrodes on both surfaces thereof, especially to that having disconnection mechanism of electrode terminals interlocked with a card holding and interlocking mechanism.

2. Description of the Related Art:

There have been conventionally proposed card read/write devices of this type.

U.S. Pat, No. 4,443,049 discloses a connector for portable objects such as credit cards comprising a casing having a card insertion opening, and a locker rotatably mounted so as to slide on a guide path wherein a tip end of the card inserted from the card insertion opening pushes a projection of the locker so that the locker is rotated at ridged lines of a ceiling in the casing whereby the electrodes of the card contact electrodes terminal of the locker.

Japanese Patent Laid-Open Publication No. 61-16386 discloses a device comprising an elastic member accumulating a discharging force by insertion of the card, a contact member for connecting electrode terminal of the contact member with an electrode of the card or disconnecting the electrode terminal from the electrode of the card with interlocking with the movement of the card, a lock mechanism for locking the card while the electrode of the card contacts the electrode terminals of contact members, a sensor for detecting that the card is inserted to a portion adjacent to a predetermined position of insertion, a holding means for holding the rear end of the inserted card by disengagement of the control lever, and a solenoid operated when the sensor detects the card for disengaging the control lever.

However, both the aforesaid U.S. Patent and Japanese Patent Laid-Open Publication execute the contact operation between the electrode of the card and the electrode terminal of the contact member by an insertion force of a card or discharge the card by a spring accumulating an energy or resilient force therein to thereby require a greater force for inserting the card which results in inferior operatability. Especially, there is a problem that the card having electrodes at both surfaces thereof requires greater force for insertion thereof.

Japanese Patent Laid-Open Publication No. 61-16386 discloses a device having a sensor for detecting the insertion of the card at an optimum, and a solenoid for holding the card by actuation thereof. However, according to this device, it takes more time from detection of the card by the sensor to contact of the electrode terminal with the electrode of the card so that there is a likelihood that the card is not kept in an appropriate position by movement of the card during that period. Hence, there is a problem that there is no assurance of contact between the the electrode and the electrode terminal.

SUMMARY OF THE INVENTION

It is an object of the present invention to provide a card read/write device enabling to lighten the card to be inserted therein and having a better operatability.

It is another object of the present invention to provide a card read/write device adapted for use in the card having electrodes on the both surfaces thereof.

To achieve the above objects, the present invention is arranged in the manner that when a card is inserted from a card insertion opening within a frame the tip end of the card is pushed to one of the projections of lever members rotatably mounted on the frame so that the other projection of the lever members urges contact members toward the side of the card. If the urging force by the lever members are greater than a resilience force of the spring for urging the contact members so as to move the contact members away from the card, that is, when the card is inserted to the innermost portion of the frame, the contact members rotatably mounted on the frame are rotatable toward the side of the card to thereby permit electrode terminals to contact the electrode of the card.

The above and other objects, featureds and advantages of the present invention will become more apparent from the following description taken in conjunction with the accompanying drawings.

DESCRIPTION OF PREFERRED EMBODIMENT

Figure 1:
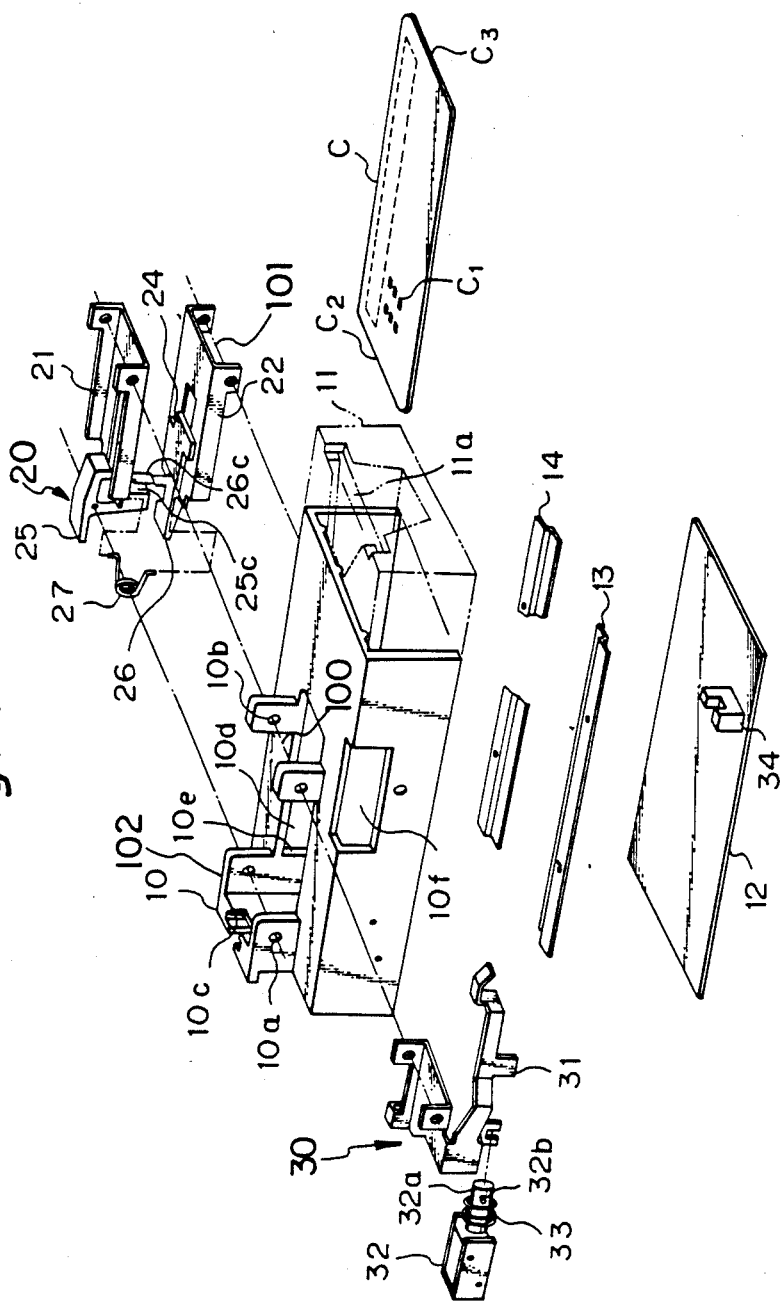
FIG. 1 is an exploded perspective view illustrating a card read/write device according to a preferred embodiment of the present invention.

A preferred embodiment of a card read/write device will be described with reference to FIGS. 1 to 3.

The card read/write device comprises a frame 10, a disconnection mechanism 20 and a holding and interlocking mechanism 30. The frame 10 comprises a front panel 11 disposed at the front end thereof, a substrate plate 12 having a sensor 34 (described later) disposed at a bottom thereof, and card guides 13, 14 fixed to inner surfaces of side wall of the frame 10. The frame 10 has first shaft receivers 10a projected upwardly from the upper rear surface of the frame 10 and integrated with a groove 10c defined therebetween for receiving a transfer lever 25 (described later), stoppers 10e integrated with first shaft receiver 10a and projected downwardly for receiving the holding and interlocking mechanism 30 and the card, second shaft receivers 10b projected upwardly from the upper central surface of the frame 10 for receiving a contact lever 21 (described later) and a lock lever 31 (described later), and a substantially rectangular opening 10d positioned between the first and the second shaft receivers 10a, 10b. The front panel 11 has a card insertion opening 11a corresponding to a width and a thickness of a card C. The front panel 11 also has a first notched portion at an upper surface thereof located over the card insertion 11a and a second notched portion at a front of the front panel 11 located under the card insertion opening 11a. The first and the second notched portions are respectively constructed to grasp the card C at a state where the card C is inserted into a portion of a predetermined position.

The disconnection mechanism 20 comprises contact levers 21, 22, contacts 23, 24 which are respectively extended in the direction of the insertion of the card C and mounted on the contact levers 21, 22, electrodes terminals 23a, 24a respectively mounted on the contacts 23, 24, transfer levers 25, 26 positioned respectively at rear ends of the contact levers 21, 22 for holding the contact levers 21, 22 and a spring 27 provided at a tip end of the contact end 24 and positioned between the transfer levers 25, 26 for urging the contact levers 21, 22 for permitting the contact lever 21, 22 to be moved away from each other. The disconnection member 20 can allow the electrode terminals 23a, 24a of the contacts 23, 24 to be moved away from electrodes C1 of the card C. The contact lever 21 is pivotally fixed to second shaft receivers 10b and rotatable around a rotative fulcrum 100 provided at the second shaft receivers 10b. The contact lever 22 is positioned opposite to the contact lever 21, pivotally fixed to shaft receivers in the frame 10 (not shown), and rotatable around a rotative fulcrum 101 provided at the shaft receivers. The transfer lever 25 has a first projection 25a capable of contacting an upper surface of the contact lever 21, a second projection 25b positioned opposite to the first projection 25a for positioning the transfer lever 25 in an axial direction by being guided by the groove 10c of the frame 10, and a third projection 25c positioned at the central portion of the transfer lever 25. The third projection 25c is positioned at an innermost portion on a card insertion path where the third projection 25c is brought into contact with the tip end C2 of the card C when the card C is inserted. At the portion opposite to the lever 25, there is provided a transfer lever 26 which is rotatable around a rotative fulcrum 103 (not shown). The transfer lever 26 has a first projection 26a which contacts a lower surface of the contact lever 22, a second projection 26b, and a third projection 26c. The second projection 26b, and the third projection 26c, respectively, function same as the second projection 25b and the third projection 25c of the transfer lever 25. The spring 27 urges the contact lever 21 clockwise (upper direction in FIG. 2) and the contact lever 22 counterclockwise (lower direction in FIG. 2). Accordingly, at the state where the card C is not inserted into the insertion opening 11a the contact levers 21, 22 are moved away from each other by a resilience force of the spring 27 whereby a sufficient larger clearance is defined between the electrode terminals 23a, 24a. The clearance is greater than the thickness of the card C. At this state, the second projection 25b of the tranfer lever 25 is brought into contact with the groove 10c of the frame 10. The arrangement of the second projection 26b of the transfer lever 26 is constructed in the same manner as the second projection 25b of the transfer lever 25.

The lock lever 31 of the card holding and interlocking mechanism 30 is supported by the fulcrum 100 same as the contact lever 21. The lock lever 31 comprises a first projection 31a having an end bent upwardly for engaging with a rear end of the inserted card C, a second projection 31b extending downwardly from the rotative fulcrum 100 and having a tip end of a U-shaped groove 31f with which a pin 32b of an armature 32a of a plunger magnet 32 constitutes an interlocking means, a third projection 31c having a tip end bent in the direction of the contact lever 21 for engaging with an arm (not shown) of the contact lever 21 to move clockwise with the clockwise movement of the contact lever 21, and a fourth projection 31d extending downward at the central portion of the lock lever 31 for functioning as a sealing plate by moving into or away from between a light emitting portion (not shown) and a light receiving portion (not shown) respectively provided with the sensor 34 while the lock lever 31 is rotated.

Figure 2:
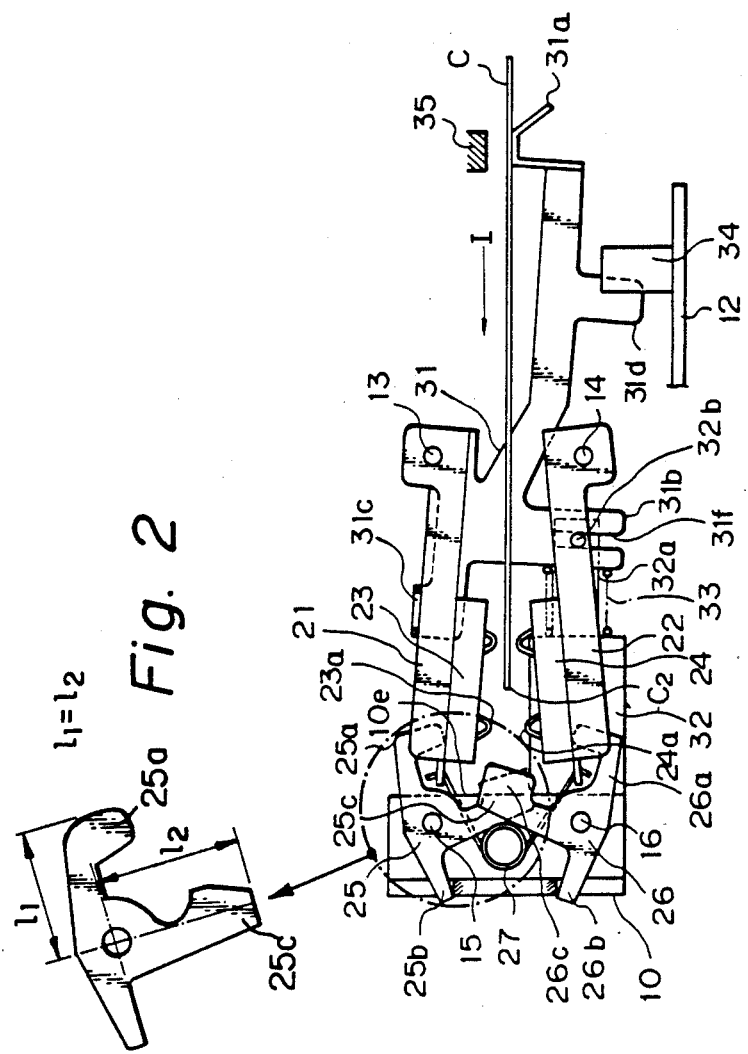
FIG. 2 is a view of assistance in explaining an operation of the card read/write device of FIG. 1 in which the card is halfway inserted.

The armature 32a has a spring 33 coiled therearound which urges the second projection 31b of the lock lever 31 counterclockwise as shown in FIG. 2. Accordingly, the spring 33 always urges the lock lever 31 counterclockwise.

With the arrangement of the card read/write device according to the present invention, the operation thereof will be described as follows.

First, an initial state where the card C is inserted is described with referenced FIG. 2. In FIG. 2, the card C is inserted halfway into the card read/write device which is in the same state as that where the card C is not inserted into the card read/write device.

At this initial state, the contact lever 21 is rotated clockwise by the spring 27 while the contact lever 22 is rotated counterclockwise by the spring 27, whereby there is provided a clearance sufficient for inserting the card C between the contact 23 of the contact lever 21 and the contact 24 of the contact lever 22.

The lock lever 31 is positioned in the same manner to be rotated clockwise as the contact lever 21 by engagement of the third projection 31c with the contact lever 21 while the first projection 31a of the lock lever 31 is positioned under the insertion path of the card C. The fourth projection 31d of the lock lever 31 is positioned away from the sensor 34.

The transfer lever 25 is rotated counterclockwise by the engagement of the first projection 25a with the contact lever 21 for thereby allowing the second projection 25b to be brought into contact with the bottom of the groove 10c of the frame 10 whereby the third projection 25c is projected toward the card insertion opening. The transfer lever 26 is rotated clockwise by the engagement of the first projection 26a with the contact lever 22 for thereby allowing the second projection 26b to be brought into contact with the bottom of the groove 10c of the frame 10 whereby the third projection 26c is projected toward the card insertion opening.

An operation at the state where the card C is inserted from the initial state will be described hereafter.

The card C is inserted from the card insertion opening 11a of the front panel 11 and guided along a predetermined path composed of the card guides 13, 14 (not shown in FIG. 2). That is, the card C passes over the first projection 31a of the lock lever 31 and inserted between the contacts 23, 24 (in the direction of I in FIG. 2). The tip end C2 of the card C is brought into contact with the third projections 25c, 26c of the transfer levers 25, 26 when the card C is pushed into innermost portion adjacent to a predetermined position, whereby the transfer lever 25 is rotated clockwise so that the first projection 25a rotates the contact lever 21 counterclockwise against the resilient force of the spring 27. Simultaneously, the transfer lever 26 is rotated counterclockwise so that the first projection 26a rotates the contact lever 22 clockwise against the resilient force of the spring 27. Accordingly the electrode terminals 23a, 24a respectively contact the electrodes of the card C. Further insertion of the card C allows the tip end C2 of the card C to bring into contact with the stopper 10e of the frame 10 for thereby preventing the card C from inserting further.

Figure 3:
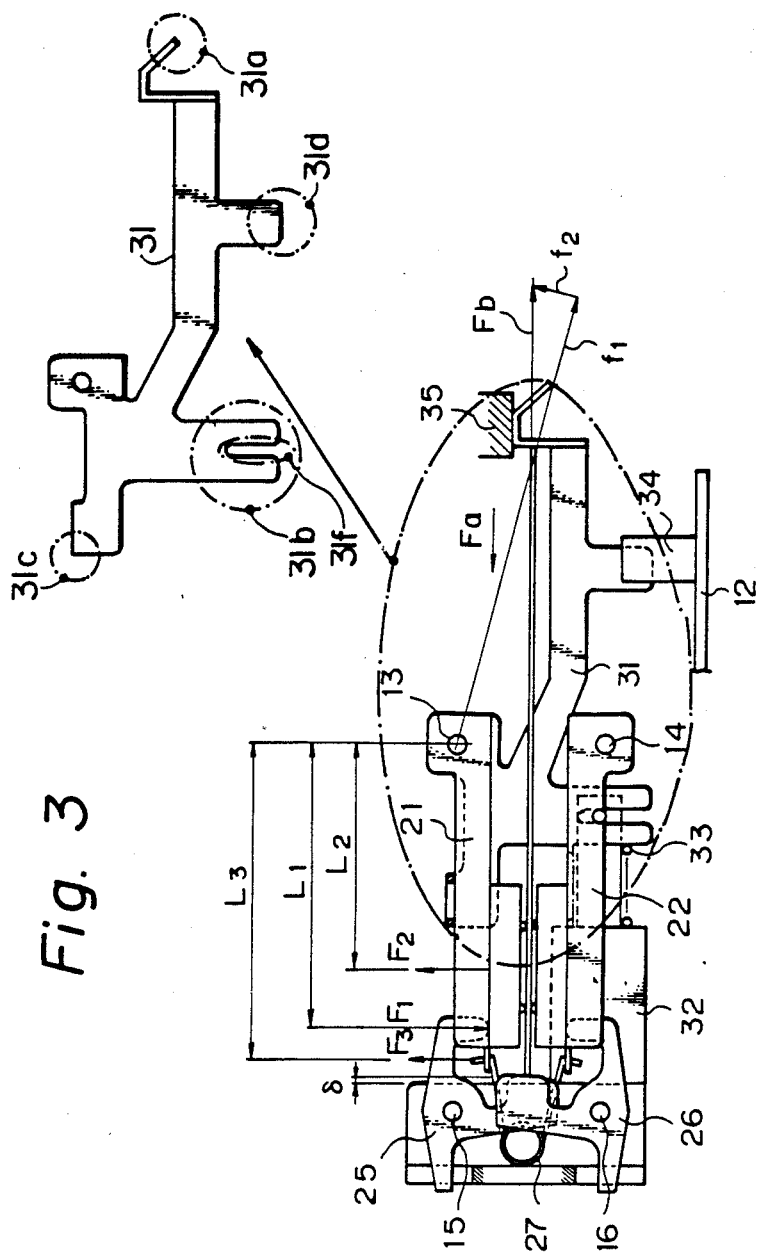
FIG. 3 is a view of assistance in explaining an operation of the card read/write device of FIG. 1 in which the card is completely inserted.

When the card C is positioned with the tip end C2 thereof being brought into contact with the stopper 10e, the rear end C3 of the card C is deviated from the position over the projection 31a of the lock lever 31 while at the same time the lock lever 31 is rotated counterclockwise by the spring 33 to thereby hold the rear end C3 of the card C as shown in FIG. 3. The holding state is kept by addition of a force F3 acting upwardly by the spring 27 to a reaction force F2 acting upwardly by a resilient force of the electrode terminal 23a of the contact 23. That is, the force F3 by the spring 27 and the force F2 by the electrode terminal 23a of the contact 23 gives a discharging force Fb to the card C via the transfer lever 25. The discharging force Fb is resolved by a dividing force f1 connecting the rotative fulcrum 100 of the lock lever 31, the rear end C3 of the card C and the contact point of the first projection 31a of the lock lever 31 and a dividing force f2 perpendicular to the dividing force f1 in which the dividing force f2 becomes the moment for rotating the lock lever 31 counterclockwise whereby the card C is held with safety. As a result, even if the card C is operated to be moved away from the frame 10 at this holding state, the dividing force F2 operates in the manner to rotate the lock lever 31 in the direction to lock the card so that the card C cannnot be extracted from the frame 10, which results in preventing the card C from being extracted during the time that data is read from or written into the card C.

The arrangement of the card read/write device according to the present invention can be modified as follows. Define a clearance having a small distance between the rear end C3 of the card C and the first projection 31a of the lock lever 31. In this modification, the card C is slightly retracted by the discharging force Fb caused by the spring 27 when the card C is pushed into device until it is brought into contact with the stopper 10e of the frame 10 and the card C is freed from the hand of an operator. With the retracting movement of the card C, the electrodes of the card C and the electrode terminals of the card read/write device are relatively moved laterally while they contact each other so that both the electrode and elctrode terminals are slidably frictioned whereby self-cleaning operation is generated to make both the electrode and electrode terminals contact in better condition.

At this state, the lock lever 31 is moved counterclockwise until it is brought into contact with the limiter 35 provided at the frame 10 whereby the shield plate 31d as the fourth projection is moved to a detecting position of the sensor 34 to switch the sensor 34. As a result, the read/write operation is started.

When the read/write operation of the card C is completed, and a signal to extract the card C by the operator from the keyboard is applied to the card read/write device, the plunger magnet 32 is energized to attract the amature 32a from the right to the left (FIG. 2) for thereby attracting the second projection 31b of the lock lever 31 connected to the pin 32b and rotating the lock lever 31 clockwise. At this time, the tip end of the first projection 31a of the lock lever 31 is disengaged from the rear end C3 of the card C so that the card C is discharged by the discharging force Fb of the spring 27 in the direction from the left to the right in FIG. 3.

In the case where the card C must be retracted manually after setting the card C, the lock lever 31 may be rotated clockwise by lowering the tip end of the first projection 31a of the lock lever 31 from the card insertion opening 11a of the front panel 11. However there is provided a lock mechanism for preventing the card C from being extracted from the card read/write device by an erroneous operation.

With the arrangement of the preferred embodiment, provided that the distance from the first projection 25a to the operating point of the rotative fulcrum 102 of the third projection 25c is same the force F1 for urging the contact lever 21 downward by the first projection 25a and the force Fa required for insertion of the card C become the same (Fa=F1). There generates an expression $$F1 \times L1 = F3 \times L3 + F2 \times L2 \qquad (1)$$

where L1 is a distance from a rotative fulcrum of the contact lever 21 to operation point of the force F1 for urging the contact lever 21 toward the card C side by the transfer lever 25, L2 is a distance from the rotative fulcrum of the contact lever 21 to the operation point of a resultant force F2 for receiving the force from the card C by the electrode terminal 23a, and L3 is a distance from the rotative fulcrum of the contact lever 21 to the operating point of a force F3 caused by the spring 27.

Since Fa=F1 the expression (1) is expressed as $$(F3 \times L3 + F2 \times L2)/L1 \qquad (2)$$

where F3×L3 functions merely to reset the contact lever and is very small compared, with F2×L2. Accordingly if the relation of L1 longer than L2 is assured, the insertion force Fa is very small to thereby facilitate the insertion of card with ease.

Inasmuch as the arrangement of the preferred embodiment employs an automatic lock mechanism without employment of electric means such as a solenoid, there is no time relay required for attracting operation by the solenoid and the dicharging force of the card C can act in the direction to hold the lock lever 31 by selecting the position of the fulcrum of the lock lever 31. Hence, it is possible not only to position correctly the card C but also to prevent in advance the card C from being discharged accidentally which is liable to occur during read/write operation by automatic locking operation of the card C and the lock lever 31 (the discharging force acting in the direction to lock the card).

Although the invention has been described in its preferred form with a certain degree of particularity, it is to be understood that many variations and changes are possible in the invention without departing from the scope thereof.

What is claimed is:

1. A card read/write device comprising:
    a frame;
    a disconnection mechanism rotatably mounted on said frame, said disconnection mechanism comprising contact members opposed to each other and respectively having electrode terminals capable of contacting electrodes mounted on a card, and transfer levers having respectively at least two projections, one of said projections urging said contact members toward the side of the card for allowing the electrode terminals of said contact members to contact said electrodes of the card when a tip end of the card inserted into the frame is pushed to another of said projections, and
    a first spring positioned at rear ends of said contact members and between said transfer levers for urging said contact members in a direction to move away from the card, wherein the following expression is established:

$$L_1 > L_2$$

where $L_1$ is a distance from a rotative fulcrum of said contact members to an operation point of the force for urging said contact members toward the side of the card by said transfer levers, and $L_2$ is a distance from the rotative fulcrum of said contact members to the operating point of a resultant force for receiving the force from the card by said electrode terminals.

2. A card read/write device according to claim 1, wherein said transfer levers are provided with two projections of substantially the same length.

3. A card read/write device comprising:
 a frame;
 a disconnection mechanism rotatably mounted on said frame; and
 a card holding and interlocking mechanism mounted on said frame for holding a card inserted into said frame to a predetermined position, said disconnection mechanism comprising contact members opposed to each other and respectively having electrode terminals capable of contacting electrodes mounted on the card, transfer levers having respectively at least two projections, one of said projections urging said contact members toward the side of the card for allowing the electrode terminals of said contact members to contact said electrodes of the card when a tip end of the card inserted into the frame is pushed to another of said projections, and a first spring positioned at rear ends of said contact members and between said transfer levers for urging said contact members in a direction to move away from the card,
 said card holding and interlocking mechanism comprising a lock lever rotatably mounted on said frame for holding the card when the card is inserted into said frame and an interlocking member interlocked with said disconnection mechanism for actuating said lock lever, and
wherein the following expression is established:

$$L_1 > L_2$$

where $L_1$ is a distance from a rotative fulcrum of said contact members to an operation point of force for urging said contact members toward the side of the card by said transfer levers, and $L_2$ is a distance from the rotative fulcrum of said contact members to the operating point of a resulted force for receiving the force from the card by said electrode terminals.

4. A card read/write device according to claim 3, wherein the lock lever has a projection for engaging the contact members so that the lock lever is interlocked with the contact members by the projection to move away from the card so that the lock lever is turned in a direction opposite to the card holding direction.

5. A card read/write device according to claim 4, wherein the interlocking mechanism comprises a second spring for urging the lock lever in the card holding direction and a solenoid for forcibly turning the lock lever in a direction opposite to the card holding direction.

6. A card read/write device according to claim 3, wherein the rotative fulcrum of said contact members and a rotative fulcrum of the lock lever are disposed at substantially the same position and the fulcrum of the lock lever is disposed at a position where rotating the lock lever in a direction to hold the card results in a moment which generates a card discharge force.

* * * * *